Figure 1:
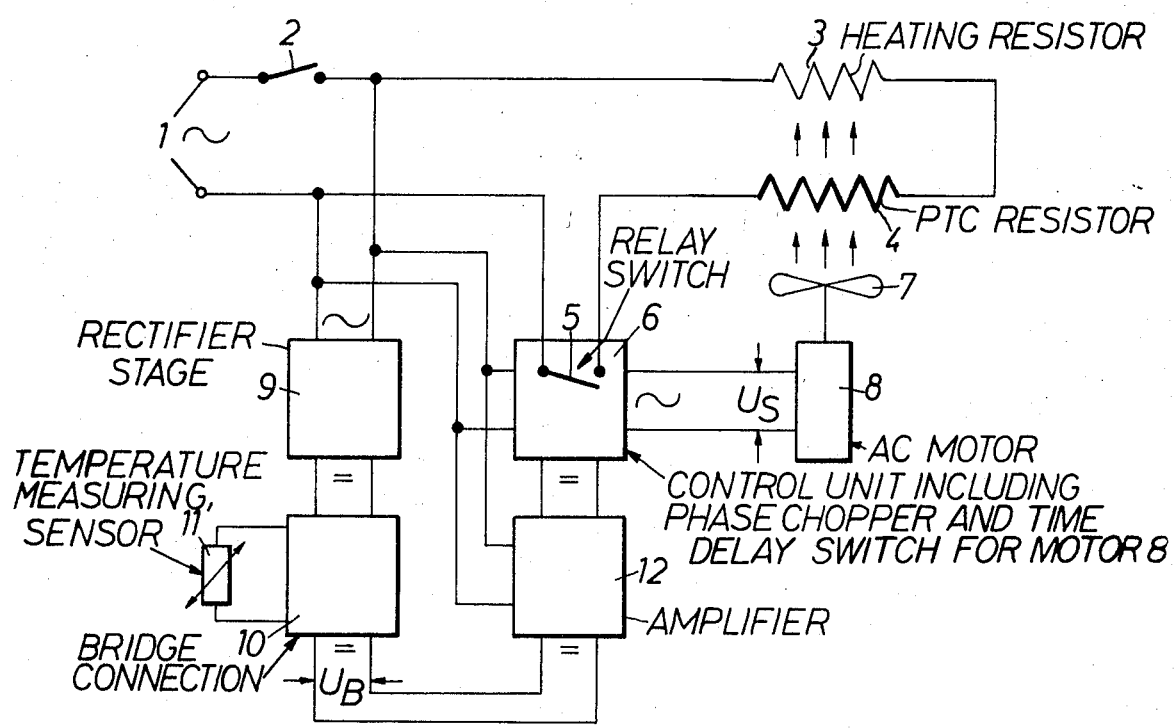

United States Patent [19]

Hallgreen

[11] 3,737,622
[45] June 5, 1973

[54] TEMPERATURE-REGULATING APPARATUS

[75] Inventor: Knud Julius Hallgreen, Nordborg, Denmark

[73] Assignee: Danfoss A/S, Nordborg, Denmark

[22] Filed: June 2, 1971

[21] Appl. No.: 149,187

[30] Foreign Application Priority Data

June 18, 1970 Germany..................P 20 29 867.3

[52] U.S. Cl. ..............219/364, 219/370, 219/379, 219/505, 338/25
[51] Int. Cl...........................H05b 1/02, F24h 3/04
[58] Field of Search..................219/504, 505, 369, 219/370, 371, 372, 363, 364, 329, 495; 338/25, 22, 23

[56] References Cited

UNITED STATES PATENTS

| 353,179 | 11/1886 | Thomson | 338/25 X |
|---|---|---|---|
| 353,180 | 11/1886 | Thomson | 338/25 X |
| 1,660,052 | 2/1928 | Shepherd | 219/370 X |
| 2,165,523 | 7/1939 | Wolf | 219/364 |
| 3,148,271 | 9/1964 | Schofer et al. | 219/504 |
| 1,654,273 | 12/1927 | Shelton | 219/364 |
| 1,919,068 | 7/1933 | Lauster | 219/504 |
| 2,939,064 | 5/1960 | Momberg et al. | 318/345 X |
| 3,399,333 | 8/1968 | Canter | 318/345 X |
| 1,429,085 | 9/1922 | McGary | 219/370 UX |

FOREIGN PATENTS OR APPLICATIONS

| 1,285,075 | 12/1968 | Germany | 219/505 |
|---|---|---|---|
| 1,075,241 | 2/1960 | Germany | 219/505 |

Primary Examiner—A. Bartis
Attorney—Wayne B. Easton

[57] ABSTRACT

Electrical heating apparatus having temperature controllable regulating means. The apparatus includes, in series, heating and PTC resistors and a temperature responsive switch. An electric motor driven variable speed blower is arranged to blow cooling air over the heating and PTC resistors. A temperature sensor and bridge apparatus cooperates to produce a voltage signal which is proportional to the deviation of the temperature from a predetermined temperature. Upon a drop in temperature the proportional voltage signal is produced and, upon being amplified, the series switch is closed to admit current to the resistors and the blower motor is driven at a speed proportional to the voltage signal. The degree or extent to which the PTC resistor is cooled by the blower determines the resistance it presents in the circuit such that increased cooling of the PTC resistors results in a greater heat output by the heating resistor, and vice versa.

6 Claims, 4 Drawing Figures

TEMPERATURE-REGULATING APPARATUS

The invention relates to temperature-regulating apparatus comprising an electrical heating resistor, the power supply of which is regulable.

It is known to use a simple on-off control means for regulating the power supplied by a heating resistor. The heating resistor is switched on at a lower temperature limit and switched off at a higher temperature limit. With this arrangement however the required constant temperature cannot be fully maintained, and overshooting frequently occurs.

Temperature can be regulated in a more accurate manner with the aid of a phase-chopping control means in which current is supplied to the heating resistor only over a portion of the phase dependent upon the regulating action. Such control means however is disadvantageous as regards the electric supply system, since numerous harmonic oscillations of a higher order and radio interference occur. The greater the power received by the heating resistor, the greater these difficulties become.

The object of the invention is to regulate an electrical heating resistor in such manner that the temperature is kept as constant as possible without troubles of the above-mentioned kind occurring.

According to the invention, this object is achieved by arranging a PTC-resistor in series with the heating resistor and by arranging for it to be cooled by a regulable stream of cold air.

The PTC-resistor is a series resistor which is heated by the current that flows through it, and the resistance of which depends upon its own temperature. If the PTC-resistor is not cool at all, it takes on a very high equilibrium temperature which reduces the heating current to a small or very small value. The more the PTC-resistor is cooled by the stream of air, the lower is the equilibrium temperature and the greater, therefore, is the heating current. The greater the heat requirement the more intense must be the stream of cooling air. Thus, in a simple manner, an analogous regulation of high powers is achieved by means of a very simple auxiliary control means. In this arrangement, the heat converted in the PTC-resistor is not lost; it can be used to supplement the heating power.

Expediently, a blower, the rate of revolution of which can be regulated, is associated with the PTC-resistor. The intensity of the stream of cooling air can be varied by simply regulating the rate of revolution.

In a preferred embodiment, the blower is provided with an A.C. motor, and regulation is achieved with the aid of a phase-chopping control means. Since the blower is of only very low capacity, e.g., 25 – 30 watts, a phase-chopping control means causes no interference since the higher harmonic oscillations are negligibly small as regards their effect upon the rest of the supply system.

It is of particular advantage to use a single blower for producing the regulable stream of air for the PTC-resistor and a stream of air for carrying the heat away from the heating resistor. If use is made of a blower having a constant rate of revolution, the air stream to be regulated can be varied by means of a throttle valve or the like. However, the heating resistor can also be disposed behind the PTC-resistor in the regulable stream of air.

The relatively small quantities of air suffice for cooling the PTC-resistor. At all events, the apparatus can be so designed that although the flow of air can be varied within wide limits, it does not have an unpleasant effect upon people in the room as the result of an excessively high velocity of flow. It is possible for example for the PTC-resistor to be swept by an air-stream having a velocity of between approximately 0.1 and 4.0 meters/sec.

In some cases, it is of advantage to provide a time-lag device which allows the air stream to become effective only at a predetermined moment after the series arrangement consisting of the PTC-resistor and the heating resistor has been switched in. In this way, the PTC-resistor is first caused to heat up rapidly to the vicinity of its equilibrium temperature after the series arrangement has been switched in, so that the correct regulating effect is achieved soon after switching in.

In one embodiment there is provided a temperature-measuring sensor which, by way of a bridge circuit, sends a signal corresponding to the variation to a control device which intensifies the air-stream as the amplitude of the signal increases. This leads to a very simple construction of the regulating apparatus.

Also, a switch can be fitted in series with the PTC-resistor and the heating resistor, this switch being actuable in dependence upon a predetermined minimum regulating variation. This means that when the required value substantially coincides with the actual value, the series connection is completely cut off from the supply system. It is then not necessary for a steady current to flow that brings the PTC-resistor to a high level of resistance.

In a further form of the invention, the blower can be regulatable in the same way, irrespective of the sign, when a regulating variation occurs, but the series connection consisting of the PTC-resistor and the heating resistor is able to be switched in only in the case of a negative variation. In this way, using the same regulating apparatus, not only can heating be achieved, but cooling as well, since if the required temperature value is exceeded, only the blower continues to operate, and more intensively the higher the temperature. If a simple circulation of air does not suffice for cooling, the blower can pass outside air into the room, or, instead of the heating device, a cooling device can be positioned in the air stream provided by the blower.

Figure 2:
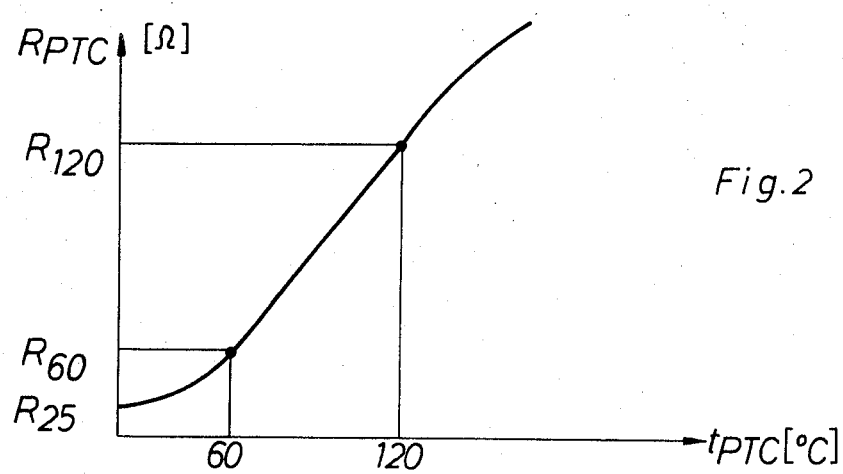
Figure 3:
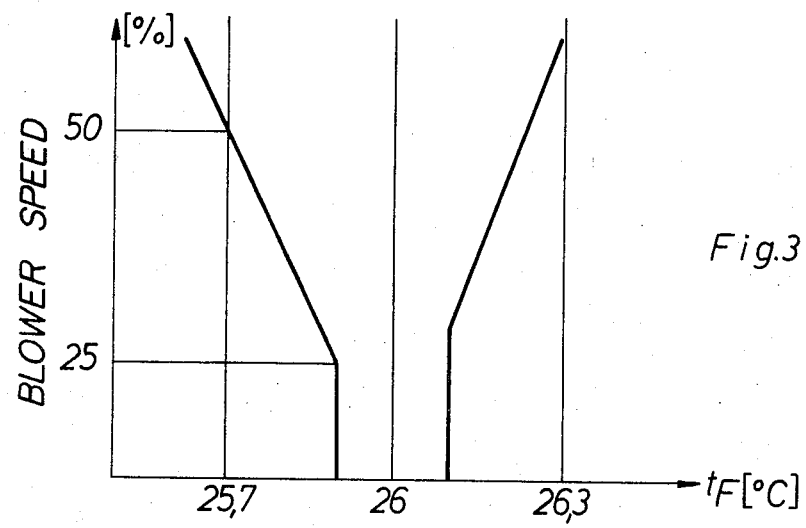
Figure 4:
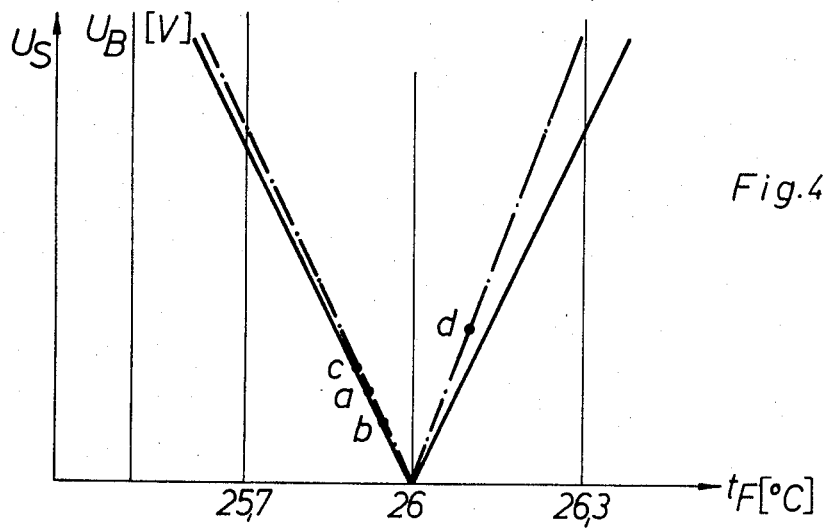

The invention will now be described in more detail by reference to an embodiment illustrated in the drawing, in which:

FIG. 1 is a block circuit diagram for the temperature-regulating apparatus of the invention, FIG. 2 shows the resistance-temperature curve of the PTC-resistor used, FIG. 3 is a graph showing the rate of revolution of the blower in relation to the temperature in the measuring sensor, and FIG. 4 is a diagram showing different voltages occurring in the apparatus in relation to the temperature in the measuring sensor.

Connected to a single-phase supply system 1, by way of a main switch 2, are the series arrangement, comprising a heating resistor 3 and a PTC-resistor 4, and a relay switch 5 which is fitted in a control unit 6 including a phase chopper and a time delay switch. A blower 7, powered by an A.C. motor 8, drives a regulable stream of air firstly over the PTC-resistor 4 and then over the heating resistor 3.

D.C. voltage is also supplied, by way of a voltage-stabilizing rectifier stage 9, to a bridge connection 10, which contains in one of its branches a temperature-measuring sensor 11 in the form of a temperature-responsive resistor. This bridge connection provides a bridge voltage $U_B$, which is proportional to the deviation of the actual temperature from an adjustable required temperature, i.e. corresponds to the regulating variation. The voltage $U_B$ is passed through an amplifier 12 to the control unit 6. The control unit and the amplifier are likewise supplied with A.C. mains voltage.

In dependence upon the amplifier bridge voltage $U_B$, the control unit, by means of a phase-chopping control and time delay switching action, produces an effective control voltage $U_S$, which is used to drive the blower motor 8 and also actuates the relay switch 5. The greater the voltage $U_B$, the greater is the control voltage $U_S$ and thus the rate of revolution of the blower and the quantity of cooling air supplied.

FIG. 2 illustrates how the resistance $R_{PTC}$ of the PTC-resistor 4 varies in dependence upon its temperature $t_{PTC}$. It is assumed that the PTC-resistor has a resistance of $R_{25}$ at room temperature, that a stable condition is reached at its inherent temperature of 120° C, and that the normal heat regulation takes place between the inherent temperatures 60° and 120° C, this corresponding to resistances of $R_{60}$ to $R_{120}$.

In FIG. 3 the rate of revolution $n$ of the blower is plotted against the temperature $t_F$ of the measuring sensor 11. FIG. 4 shows the bridge voltage $U_B$ in solid lines, and the control voltage $U_S$ in broken lines, against the same temperature $t_F$. The scale used in FIG. 4 is such that in the heat range, i.e., to the left of the required temperature of 26° C, the two curves coincide.

If the temperature falls below the required level of 26° C, then after approximately 0.07° C, the switch 5 is closed and current is supplied to the PTC-resistor 4 and the heating resistor 3. This corresponds to the point $a$ in FIG. 4. The flowing current is at its maximum value. Consequently, the PTC-resistor 4 becomes so much heated in a short time, e.g., 30 seconds, that it passes into its highly resistive range. In the meantime, the temperature has dropped further, e.g., by 0.1° C. Here, the point $c$ in FIG. 4 is reached, at which point the blower begins to operate. The blower is thus switched on after a certain time-lag.

The air from the blower now cools the PTC-resistor, and the more the temperature has dropped, the more intensive is the cooling effect. In the present embodiment, a drop of 0.3° C in the actual temperature corresponds to a rate of revolution $n$ of the blower of 50 percent. This cools the PTC-resistor to such an extent that it acquires a temperature of 60° C with which is associated a relatively low resistance $R_{60}$. Consequently, considerable power is supplied to the heating resistor 3. If, as a result of the heating, the temperature rises again, the blower switches off at the point $c$, and the switch 5 is opened at the point $b$. Between these points $c$ and $b$, a low current still flows through the resistors 3 and 4, and this is justified since the required temperature is not yet fully reached. If however the measuring sensor shows at point $b$ that the required value has been approached to within 0.05° C, this current can also be switched off.

If the measuring sensor 11 shows that the temperature $t_F$ is above the required level, the blower can be used for cooling, all the components being retained. This can be seen in that portion of FIGS. 3 and 4 to the right of the required temperature of 26° C. In this range, the resistors 3 and 4 are switched off by the switch 5. However, the blower motor is switched on again at the point $d$ if a regulation deviation of 0.1° C occurs. The blower delivers air in a quantity proportional to the temperature deviation. In regulating the cooling effect, use can be made of a different ratio between the bridge voltage $U_B$ and the control voltage $U_s$, as shown in FIG. 4. The cooling effect can be intensified if the air delivered in this condition is supplied to the room from the outside, or is passed through a cooling device. The latter can be done for example by the switch 5 being a reversing switch which connects the cooling device in its other position. A heating power can be regulated over quite wide ranges, e.g., between 45 and 800 watts, in the manner described.

It also suffices to expose only the PTC-resistor 4 to the effect of the regulating air-stream. The air stream can also be regulated by fitting an adjustable baffle. This is advantageous when for example use is not made of a blower but of a simple convection current for producing the regulating air stream.

I claim:

1. Heating apparatus comprising a circuit having a heating resistor, a PTC resistor in series with said heating resistor, terminal means for said circuit for connection to a power supply, ambient temperature sensing means, controllable and regulatable air supply means and including regulating means responsive to said temperature sensing means for directing a regulated stream of cooling air over said PTC resistor to increase or decrease the flow of current through said heating resistor in direct proportion with the deviation from a desired temperature as sensed by the sensing means, said air supply means comprising a variable speed blower and said regulating means regulating the speed of said blower.

2. Heating apparatus according to claim 1 wherein said blower has an AC motor, said regulating means includes phase chopping control means for regulating the speed of said motor in accordance with the temperature sensed by the sensor.

3. Heating apparatus according to claim 1 wherein said blower produces an air stream for cooling both of said resistors, said heating resistor being positioned downstream from said PTC resistor.

4. Heating apparatus according to claim 1 including first switch means in series with said resistors and second switch means in circuit with said motor, said regulating means including control means for actuating said first and second switch means in response to temperature sensed by said sensing means, and said control means including means for delaying the actuation of said second switch a predetermined period after the first switch has been actuated.

5. Heating apparatus according to claim 4 wherein said temperature sensing means is connected in a bridge connection for producing a signal proportional to deviation from a predetermined temperature and the signal is applied to the regulating means for regulating the speed of the blower.

6. Heating apparatus according to claim 5 wherein said signal is also applied to said control means to actuate said first and second switch means.

* * * * *